United States Patent
Culler

(10) Patent No.: US 9,527,014 B1
(45) Date of Patent: Dec. 27, 2016

(54) WASTEWATER SEPARATOR

(71) Applicant: Eco Wastewater Concentrator, LLC, Fort Lauderdale, FL (US)

(72) Inventor: Paul L Culler, Tequesta, FL (US)

(73) Assignee: Eco Wastewater Concentrator, LLC, Fort Lauderdale, FL (US)

(*) Notice: Subject to any disclaimer, the term of this patent is extended or adjusted under 35 U.S.C. 154(b) by 0 days.

(21) Appl. No.: 15/018,825

(22) Filed: Feb. 8, 2016

(51) Int. Cl.
*B01D 21/26* (2006.01)
*B04C 3/06* (2006.01)
(Continued)

(52) U.S. Cl.
CPC ............... *B01D 21/262* (2013.01); *B04C 3/06* (2013.01); *B04C 9/00* (2013.01); *C02F 1/385* (2013.01);
(Continued)

(58) Field of Classification Search
CPC ...... B04C 3/06; B04C 2003/006; B04C 5/103; B04C 5/107; B04C 5/12; B04C 5/13; B04C 9/00; B04C 2009/007; B04B 5/10; B04B 5/12; F04D 3/02; F04D 1/04; F04D 29/181; F04D 29/406; C02F 1/008; C02F 1/38; C02F 1/44; C02F 1/40; C02F 9/00; C02F 11/12; C02F 11/121; C02F 11/122; C02F 11/123; C02F 11/125; C02F 11/126; C02F 11/127; C02F 2101/30; C02F 2103/002; C02F 2103/003; C02F 2103/005; C02F 2103/42; C02F 2209/003; C02F 2209/005; C02F 2209/006; C02F 2209/10; C02F 2209/40; B01D 21/26; B01D 21/262; B01D 21/267; B01D 21/0018; B01D 17/0217
See application file for complete search history.

(56) References Cited

U.S. PATENT DOCUMENTS 3,493,120 A * 2/1970 Milner .................... B04C 5/103
210/512.1
4,478,712 A 10/1984 Arnaudeau
(Continued)

FOREIGN PATENT DOCUMENTS

CN 203741187 U 7/2014
DE 1152973 B * 8/1963 ............... B03B 5/34
(Continued)

OTHER PUBLICATIONS

Enviro Voraxial Technology, Inc., presentation handout, Mar. 16, 2011, accessed on the Internet at https://nrm.dfg.ca.gov/FileHandler.ashx?DocumentID=29708 on Nov. 15, 2015.
(Continued)

*Primary Examiner* — David C Mellon
(74) *Attorney, Agent, or Firm* — Stone Creek Services LLC; Alan M Flum

(57) ABSTRACT

Disclosed is an apparatus for separating solids within a water carrier having different specific gravities. The apparatus includes an axial-flow pump with an impeller (13). The apparatus includes a hollow tube (11) sized and positioned to discharge a fluid stream where the solids within the fluid stream have a specific gravity less than one. The hollow tube (11) includes an inward facing opening that makes an oblique angle along its entire circumference with respect to a longitudinal axis of the hollow tube (11). This arrangement is especially useful in municipal and sanitary wastewater treatment applications for keeping lighter-than-water debris such as hair, food fiber, and synthetic fibrous materials from building up against the leading edge of the hollow tube (11) and clogging it.

12 Claims, 4 Drawing Sheets

(51) Int. Cl.
| | |
|---|---|
| *B04C 9/00* | (2006.01) |
| *F04D 1/04* | (2006.01) |
| *F04D 3/02* | (2006.01) |
| *F04D 29/40* | (2006.01) |
| *C02F 1/38* | (2006.01) |
| *F04D 29/18* | (2006.01) |

(52) U.S. Cl.
CPC .......... *B04C 2009/007* (2013.01); *F04D 1/04* (2013.01); *F04D 3/02* (2013.01); *F04D 29/181* (2013.01); *F04D 29/406* (2013.01)

(56) References Cited

U.S. PATENT DOCUMENTS

| | | | |
|---|---|---|---|
| 4,834,887 A | 5/1989 | Broughton | |
| 4,956,926 A | 9/1990 | Glorioso | |
| 5,062,955 A * | 11/1991 | Sciamanna | B01D 17/0217 209/210 |
| 5,084,189 A | 1/1992 | Richter | |
| 5,837,142 A | 11/1998 | Mullerheim et al. | |
| 5,904,840 A | 5/1999 | DiBella | |
| 6,248,231 B1 | 6/2001 | Di Bella et al. | |
| 6,488,853 B1 | 12/2002 | Mullerheim | |
| 7,169,305 B2 | 1/2007 | Gomez | |
| 7,727,386 B2 | 6/2010 | DiBella et al. | |
| 8,062,522 B1 | 11/2011 | Culler | |
| 8,066,887 B1 | 11/2011 | Culler | |
| 8,092,692 B2 | 1/2012 | Nilsen et al. | |
| 8,101,078 B1 | 1/2012 | Culler | |
| 8,142,656 B1 | 3/2012 | Culler | |
| 8,425,782 B2 | 4/2013 | Culler | |
| 8,852,323 B2 | 10/2014 | Schook | |
| 2005/0109684 A1 | 5/2005 | DiBella et al. | |
| 2009/0176638 A1 | 7/2009 | Bella | |
| 2011/0147306 A1 | 6/2011 | Polizzotti et al. | |
| 2011/0297597 A1 | 12/2011 | Di Bella et al. | |
| 2012/0145633 A1 | 6/2012 | Polizzotti et al. | |
| 2015/0299006 A1 | 10/2015 | Kincaid et al. | |

FOREIGN PATENT DOCUMENTS

| | | |
|---|---|---|
| KR | 101346207 B1 | 12/2013 |
| WO | 0100296 A1 | 1/2001 |

OTHER PUBLICATIONS

Enviro Voraxial Grit Separator Hillsborough County Demonstration Project Report PO No. DPWA03728202, Sep. 2004Enviro Voraxial Technology, Ft. Lauderdale, FL.
Wastewater treatment solid liquid cyclone separator high speed centrifuge, Chengdu Wes Petroleum Equipment Co., Ltd., accessed on the Internet at: http://www.alibaba.com/product- gs/655735867/wastewater_treatment_solid_liquid_cyclone_separator. html on Nov. 16, 2012.
Animal manue solid liquid separator with best quality, Zhengzhou Mahaco Trading Co., Ltd., China, accessed on the Internet at: http://www.alibaba.com/product- gs/605253719/Animal_manure_solid_liquid_separator_with.html on Nov. 20, 2012.
Introducing GEA Wesffailia Separator ecoforce, Nov. 5, 2012, GEA Mechanical Equipment US, Inc. Northvale, NJ.
Case Study Naval Facilities Engineering Command Point Mugu, CA Storm/Waste Water Treatment, Feb. 11, 2013, Enviro Voraxial Technology, Ft. Lauderdale, FL. Accessed on the Internet at http://www.evtn.com/case_studies/Case_Study_Naval_Facilities_Pt_M ugu.pdf on Nov. 17, 2015.
EVTN Announces Voraxial Order for Produced Water Treatment, Mar. 15, 2015, Enviro Voraxial Technology, Inc., Fort Lauderdale, FL. (Note: that this is a press release of the Assignee and Inventor's test use of the voraxial separator).
George Tchobanoglous, The Evolution of Wastewater Treatment, H2O New York City Water Summit, Apr. 9, 2010, p. 30, New York, NY.
Andreas Hauser, Technology Options for Sustainable Wastewater Solutions, Sub-regional Conference on Wastewater Management, Jan. 30, 2013, p. 8, Asian Development Bank, Manila, Philippines.
Lynn Fossee, Addressing One of the Largest Markets Sectors in the World with their Voraxial Separator, Enviro Voraxial Technology, Inc. is Helping their Oil and Gas, Food Procesing, Mining and Deredging Customers Reduce Costs in Spearating Contaminants from Large Volumes of Liquids, CEOCFO Magazine, Sep. 24, 2012, Palm Harbor, FL.
Voraxial Separator by EVTN (cutsheet), Jun. 27, 2013, accessed on the Internet at http://www.evtn.com/pdf_publications/Voraxial_Separators_Overview_FINAL.pdf on Nov. 15, 2015.
Dann Samela, John Di Bella, Voraxial Separator for Separation of Oil and Solids from Produced Water, 20th Annual Produced Water Society Meeting, Houston TX, Jan. 2010, Downloaded from the Internet at: http://www.evtn.com/pdf_publications/EVTN_Produced_Water_Society_Houston.2010_main_blue3.pdf on Jan. 17, 2016.
EVTN Three Phase Separator, Sep. 2015, Auxill Netherland, Netherlands, downloaded from the Internet at www.auxill.nl/en/download/Auxill%2520EVTN%2520UK%252015.pdf on Jan. 17, 2016.
Case Study Voraxial 2000 Separator Deck Drainage System, Feb. 11, 2013, Enviro Voraxial Technology, Ft. Lauderdale, FL US, downloaded from the Internet at http://www.evtn.com/case_studies/Voraxial_2000_Deck_Drainage_System.pdf.
Paul L Culler, Wastewater Treatment System and Method, U.S. Appl. No. 15/018,863, filed Feb. 8, 2016, United States Patent and Trademark Office, Alexandria, VA, US.
James P. Elliot, Preliminary Engineering Report Eco Wastewater Concentrator (EWC) Demonstration Project Proof of Concept—Phase I, Apr. 2015, Eco Wastewater Concentrator Inc., Fort Lauderdale, FL US.

* cited by examiner

WASTEWATER SEPARATOR

FIELD OF INVENTION

The present disclosure relates to an apparatus that utilizes an axial-flow pump for separating solids within a fluid carrier, such as in sanitary and municipal wastewater, according to the specific gravity of each solids component.

BACKGROUND

Axial-flow pumps use centrifugal force to separate immiscible fluids, or solids within a fluid carrier, by specific gravity and have impellers that direct the flow of fluid axially. Axial-flow pumps can be configured to separate solids within a water carrier into three separate streams by specific gravity: a lighter than water solids stream, a heavier-than-water solids stream, and water. Amos Broughton in U.S. Pat. No. 4,834,887 describes an axial-flow pump with three output streams. A special type of axial-flow pump was developed by Harvey Richter and described in U.S. Pat. No. 5,084,189 (hereafter, "Richter's separator"). Richter's separator utilizes an impeller with a hollow core. The hollow core occupies the central axis of the impeller and passes fluid from the device inlet. The impeller includes two or more helical blades having decreasing axial pitch in a direction of fluid flow. Because Richter's impeller is hollow in the center, it does not have a central shaft to drive it. Instead, Richter's impeller is driven by a rotating drum attached along the outer circumference of the impeller.

Enviro Voraxial Technology Inc. (EVTN) sells devices that are based on the principles of Richter's separator and sold under the registered trademark "Voraxial." EVTN, as well as others, have disclosed separators that are based on the principles of Richter's separator that separate immiscible fluids, or solids within a fluid carrier, into three components by specific gravity: a lighter-than-water, equal to water, and heavier-than-water. The lighter-than-water component is discharged through a hollow tube with at least an inlet portion axial to the center of the hollow impeller. EVTN's three-output Richter-type separators have primarily been used to separate oil from water and from heavier-than-water components such as sand or grit. Typical applications of the three-output Richter-type separators include oil spill cleanup, oil extraction, and oil/petroleum processing operations.

SUMMARY

As late as Feb. 25, 2015, the inventor utilized a three-output Richter-type separator in experimental testing at the Palm Beach County Western Region Wastewater Treatment Wastewater Plant in Pahokee, Fla. To our knowledge, this is the first actual use of a three-output Richter-type separator for creating three output streams: a lighter-than-water solids stream, water, and heavier-than-water solids stream from municipal wastewater. The lighter-than-water solids stream is a fluid stream where the solids within the fluid stream have a specific gravity less than one. The heavier-than-water solids stream is a fluid stream where the solids within the fluid stream have a specific gravity greater than one. The lighter-than-water solids stream discharge pipe is a hollow tube that is axial to the center of the impeller, and inwardly co-axial to a body of the separator. The body of the separator extends longitudinally downstream from the impeller and contains the fluid during the separation process.

The lighter-than-water solids stream discharge pipe used in the initial stages of the pilot project was a hollow cylindrical tube. The inventor observed that food fiber, hair, and other fibrous or stranded lighter-than-water materials would tend to wrap around the leading edge of the tube and be held in place by the force of liquid rushing into the tube. The inventor observed that as an individual hair or fiber strand approached the tube, if part of the strand extended into the opening and another part extended outside the opening, at the point of collision with the tube, the force from the rushing water would tend to fold the fiber into a u-shape. This u-shaped fiber would wrap around the leading edge of the tube with part of the fiber pinned to the inside of the tube and the other part of the fiber pinned to the outside of the tube. The inventor reasoned that the force of water rushing into the tube has a vector predominately parallel to the axis of flow and perpendicular to the leading edge of the tube. Eventually, hair and fibrous material would build-up at the leading edge and partially occlude the opening at the end of the tube, restricting the flow of lighter-than-water solids such as feces or food waste into the tube.

The inventor experimented with reducing the friction near the entrance of the tube by polishing the inside and outside of the hollow tube near the opening. In addition, the inventor experimented with rounding the leading edge. While both of these helped to somewhat reduce the build-up of material in the entrance of the hollow tube, they did not prevent the opening of the hollow tube from becoming partially occluded. The breakthrough came when the inventor discovered that fibrous material build-up can be minimized by changing the shape of the leading edge of the hollow tube in order to minimize fluid forces perpendicular to the leading edge of the tube. The inventor accomplished this by making a spoon shaped opening at the end of the tube so that the opening makes an oblique angle along nearly its entire circumference with respect to a longitudinal axis of the hollow tube. One of the advantages of this structure is that it significantly decreases build-up of hair, food fibers, and other stringy or fibrous material around the inside opening of the hollow tube thereby increasing flow of material through the hollow tube.

This structure is not just limited to Richter-type separators, but can be applied to other axial-flow pumps for separating fluids of different specific gravities that include an impeller, a body extending longitudinally downstream from the impeller, and a hollow tube positioned axial to the impeller, inwardly co-axial to the body and extending longitudinally into the body, where the hollow tube is sized and positioned to discharge a separated fluid fraction with a specific gravity less than one. The apparatus is characterized by the opening of the hollow tube that faces the impeller, where the opening makes an oblique angle along its entire circumference with respect to a longitudinal axis of the hollow tube.

The inventor also discovered the build-up of fiber and other debris on the opening of the hollow tube could be further discouraged by optionally rotating the hollow tube. This can be accomplished, for example, by rotating the hollow tube by a motor and using a mechanical shaft seal coupling to create a watertight seal between the rotating hollow tube and the body of the apparatus. As the tube rotates, the direction of the force of water on the leading edge of the hollow tube will constantly change. This will tend to further dislodge any material that may be hanging on to the leading edge. This is especially advantageous to help prevent build-up of fibrous material on the opening of the hollow tube over a long period of time.

The above described embodiments can be advantageously applied in municipal and sanitary wastewater treatment facilities, commercial food processing wastewater separation, or other applications where it is desirable to use an axial-flow separator as described above, to separate lighter-than-water solids that include fibrous or stringy material.

DRAWINGS

DETAILED DESCRIPTION

Figure 1:
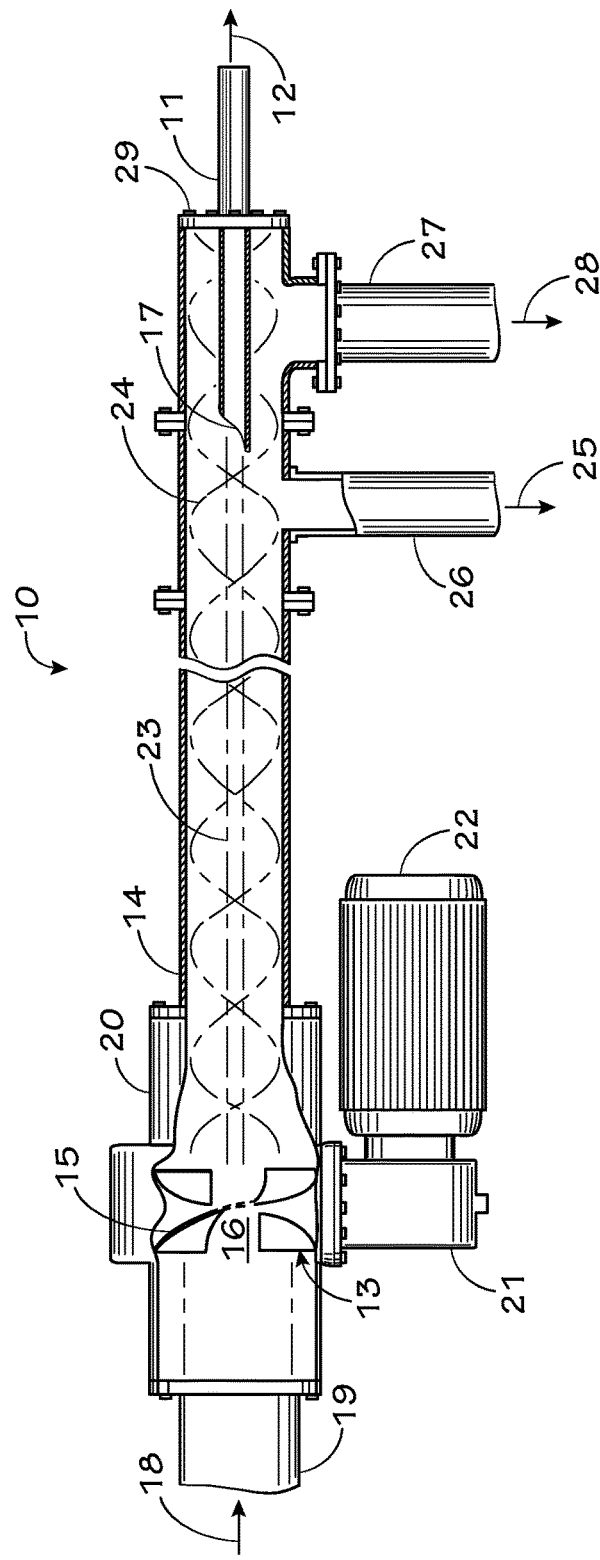
FIG. 1 illustrates a front elevation view, in partial cut-away, of an improved three-output Richter-type separator of the present disclosure illustrating a novel configuration that includes a hollow tube sized and positioned to discharge a fluid stream where the solids within the fluid stream have a specific gravity less than one.

The following terms are used throughout this disclosure and are defined here for clarity and convenience.

Richter-type separator: as used in throughout this disclosure, a Richter-type separator is defined as an axial-flow type separator for separating immiscible fluids, or solids within a fluid carrier, having different specific gravities, and a discharge manifold body connected to the fluid pump for drawing components having heavier specific gravity, where the fluid pump employs an impeller having a hollow core for passing fluid from an inlet, the impeller having a decreasing axial pitch in the direction of fluid flow. A Richter-type separator is exemplified by U.S. Pat. No. 5,084,189 by inventor Harvey E. Richter. The entire contents of U.S. Pat. No. 5,084,189 are herein incorporated by reference.

Three-output Richter-type separator: as used throughout this disclosure, a three-output Richter-type separator is defined as a Richter-type separator that separates immiscible fluids, or solids within a fluid carrier, into at least three components according to specific gravity. Examples of a three-output Richter-type separators can be found in U.S. Patent Application No. 2012/0145633 and U.S. 2011/0147306 both to Polizzotti et al.

Improved three-output Richter-type separator: as used throughout this disclosure, an improved three-output Richter-type separator is defined as a three-output Richter-type separator that embodies one or more inventive improvements of the present disclosure.

Axial-flow type separator: as used throughout this disclosure, an axial-flow type separator is a defined as a centrifugal separation device for separating immiscible fluids, or solids within a fluid carrier, of different specific gravities by utilizing an axial-flow pump. An axial-flow pump is a centrifugal pump that uses an impeller that directs the flow of fluid axially rather than radially.

Municipal wastewater: as used throughout this disclosure, municipal wastewater is defined as disposed water from communities, such as cities or towns that flows through a sewage piping system and is treated at a municipal wastewater treatment plant. Municipal wastewater generally includes human feces, urine, hair, as well as food waste products. Municipal wastewater can include both domestic sewage, i.e. sewage from houses and apartments and spent water from commercial operations that drain into the municipal sewage piping system. Municipal wastewater may also include storm water run-off that is mixed into the sewage piping system.

Sanitary Wastewater: as used throughout this disclosure, sanitary wastewater, or sanitary sewage, is wastewater that includes biologically active solids such as human feces or food waste products.

The terms "top", "bottom", "left", and "right", unless otherwise indicated, are used to help orient the reader to the position of a particular feature in the various figures and are merely meant to indicate relative position with respect to the figures. The following description is made with reference to figures, where like numerals refer to like elements throughout the several views.

FIG. 1 illustrates a front elevation view, in partial cut-away, of an improved three-output Richter-type separator 10 of the present disclosure illustrating a hollow tube 11 of a novel configuration, sized and positioned to discharge a lighter-than-water solids stream 12. The lighter-than-water solids stream 12 is a fluid stream where the solids within the fluid stream have a specific gravity less than one. The lighter-than-water solids stream 12 can also include lighter-than-water immiscible fluids such as oil. The improved three-output Richter-type separator 10 includes an impeller 13 and a body 14 extending longitudinally downstream from the impeller 13. The impeller 13 includes two or more helical blades 15 having decreasing axial pitch in a direction of fluid flow and defining a hollow core 16 that passes fluid and occupies a central axis of the impeller 13.

The hollow tube 11 is axial to the hollow core 16, inwardly co-axial to the body 14, and extending longitudinally into the body 14. The hollow tube 11 is sized and positioned to discharge the lighter-than-water solids stream 12. In FIG. 1, the hollow tube 11 is positioned against the end of the body 14 distal to the impeller. The cross sectional diameter of the hollow tube 11 is smaller than the diameter of hollow core 16. A tube end 17 of the hollow tube 11 faces the impeller 13 and defines an opening of the hollow tube.

The improved three-output Richter-type separator 10 is characterized by the opening of the hollow tube 11 making an oblique angle along nearly all of its circumference with respect to a longitudinal axis of the hollow tube 11. The novel shape and configuration of the hollow tube 11 and the tube end 17 in combination with the vector forces created within the improved three-output Richter-type separator 10 creates the unexpected result of fibrous debris such as food fiber, hair, string not accumulating on the edge of the leading edge of the hollow tube 11.

As further illustrated in FIG. 1, the unseparated fluid 18 enters the Richter-type separator through an inlet 19. In the municipal wastewater treatment pilot study conducted by the Inventor in 2015, the unseparated fluid was municipal wastewater and included sanitary wastewater products such as human feces and food waste. To our knowledge, this is the first time a three-output Richter-type separator was used in the separation of sanitary wastewater. The inlet 19 is illustrated as being inwardly co-axial to the axial-type pump housing 20. Because the impeller 13 has a hollow core 16, there is no central shaft to drive the impeller 13. In FIG. 1, the impeller 13 is rigidly attached to a rotating drum surrounding the outer circumference of the impeller 13. The rotating drum is not shown but hidden beneath the drum housing 21. The drum, in turn is driven by a motor 22. The motor 22 illustrated is electric, however, the motor 22 can also be a hydraulic motor or water-driven motor.

As the unseparated fluid 18 passes through the hollow core 16 and the helical blades 15 of the impeller 13, a low-pressure area 23 in the center of the line of flow is initiated from the hollow core 16 with the lighter-in-water specific gravity constituents. A higher velocity flow 24 tends toward the perimeter of the body 14. The higher velocity flow 24 includes water and heavier-than-water solids constituents 25. The heavier-than-water solids constituents 25 will discharge from the body 14 at a first outlet port 26. A second outlet port 27 will discharge a partially clarified water stream 28. The partially clarified water stream 28 can include dissolved and suspended solids with a specific gravity of one. The fluid and lighter-than-water debris flowing in the low-pressure area 23 along the central axis is discharged through the hollow tube 11. The hollow tube 11 is shown passing through an aperture 38 in a cover plate 29 and makes a watertight seal with the cover plate 29. The cover plate 29 makes a watertight seal with the body 14.

Figure 2:
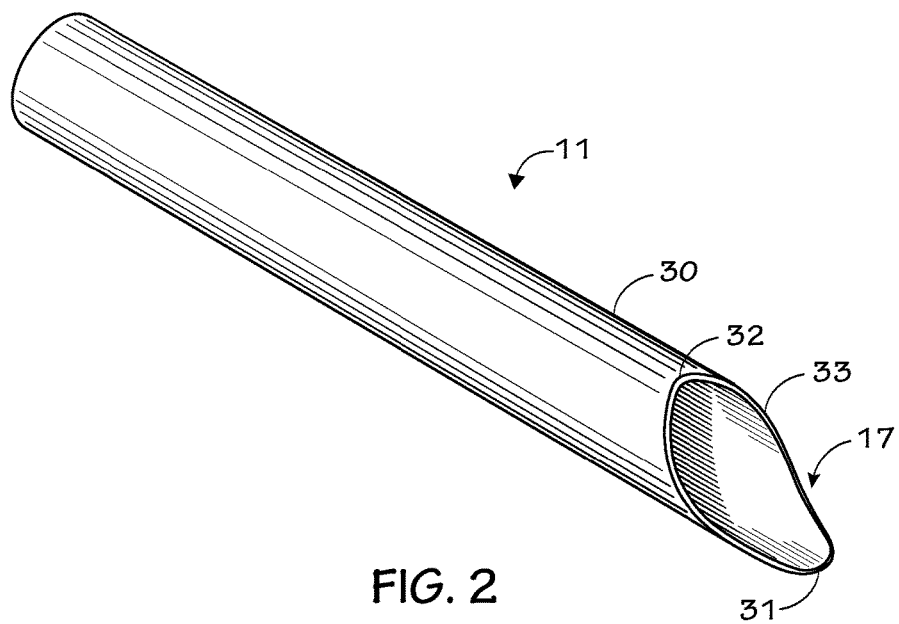
FIG. 2 shows a front and top perspective view of the hollow tube of FIG. 1.
Figure 3:
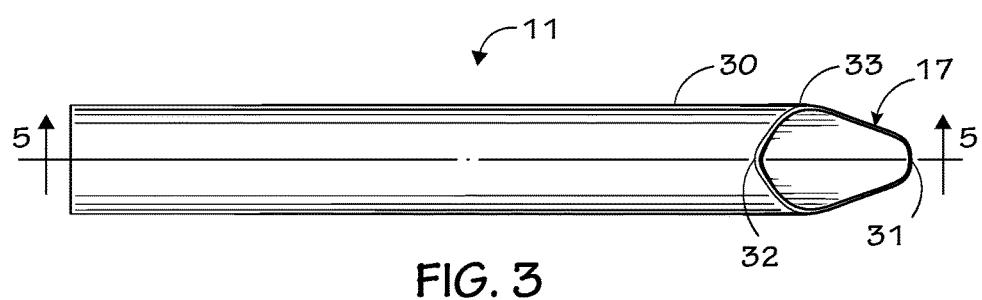
FIG. 3 shows a top plan view of the hollow tube of FIG. 2.
Figure 4:
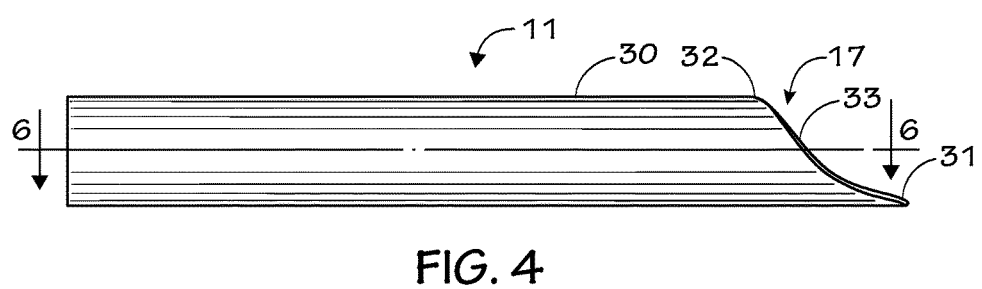
FIG. 4 shows a front elevation view of the hollow tube of FIG. 2.
Figure 5:
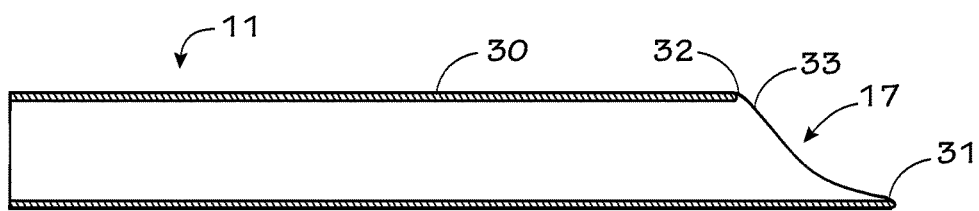
FIG. 5 shows a sectional view of the hollow tube of FIG. 3 taken along section lines 5-5.
Figure 6:
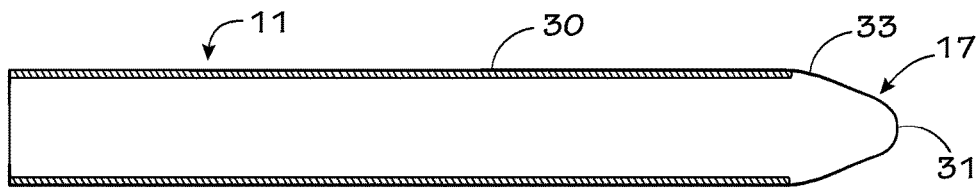
FIG. 6 shows a sectional view of the hollow tube of FIG. 4 taken along section lines 6-6.

Looking at the hollow tube 11 in more detail, FIG. 2 shows a front and top perspective view of the hollow tube 11 of FIG. 1. FIG. 3 shows a top plan view of the hollow tube 11 of FIG. 2. FIG. 4 shows a front elevation view of the hollow tube 11 of FIG. 2. FIG. 5 shows a sectional view of the hollow tube 11 of FIG. 3 taken along section lines 5-5. FIG. 6 shows a sectional view of the hollow tube 11 of FIG. 4 taken along section lines 6-6. Referring to FIGS. 2-6, the hollow tube body 30 is illustrated as primarily a cylindrical tube, extending from the left portion of the figures, with the tube end 17 on the right side of the figures, that is non-cylindrical, and so shaped as to keep hair, string, food fibers, and other lighter-than-water fibrous material from building up on the leading edge.

The inventor discovered that fibrous material build-up can be minimized by changing the shape of the leading edge of the hollow tube in order to minimize fluid forces perpendicular to the leading edge of the tube end 17. The inventor accomplished this by making a spoon shaped opening at the tube end 17, as shown in FIGS. 2-6, so that the opening makes an oblique angle along nearly its entire circumference with respect to a longitudinal axis of the hollow tube. In FIGS. 2-6, the most forward position 31 of the tube end 17, and in FIGS. 2-5, the most rearward position 32 of the tube end 17, include portions where the leading edge is perpendicular to the fluid forces axial with the hollow tube 11. However, this represents less than 10% of the entire circumference of the tube end 17, and therefore provides a practical solution for minimizing fluid forces perpendicular to the leading edge of the tube end 17.

The tube end 17 includes a first cross section illustrated in FIG. 5 and a second cross section perpendicular to the first cross section illustrated in FIG. 6. The first cross section is taken along section lines 5-5 in FIG. 3. The second cross section is taken along section lines 6-6 in FIG. 4. Each of the cross sections are taken along a plane along the longitudinal axis of the hollow tube 11. The first cross section forms a concave shape along the end portion profile edge 33. The second cross section forms a convex shape along the end portion profile edge 33. This shape profile was shown to further discourage build-up of fibrous debris.

To further discourage collection of fibrous debris, the end portion profile edge 33 can be rounded and both the interior of the tube and exterior of the tube can optionally be polished proximate to the end portion profile edge 33. It is sufficient to polish the tube a distance from the profile edge equal to half the length of longest hair or fiber that is anticipated would pass through the hollow tube 11.

Figure 7:
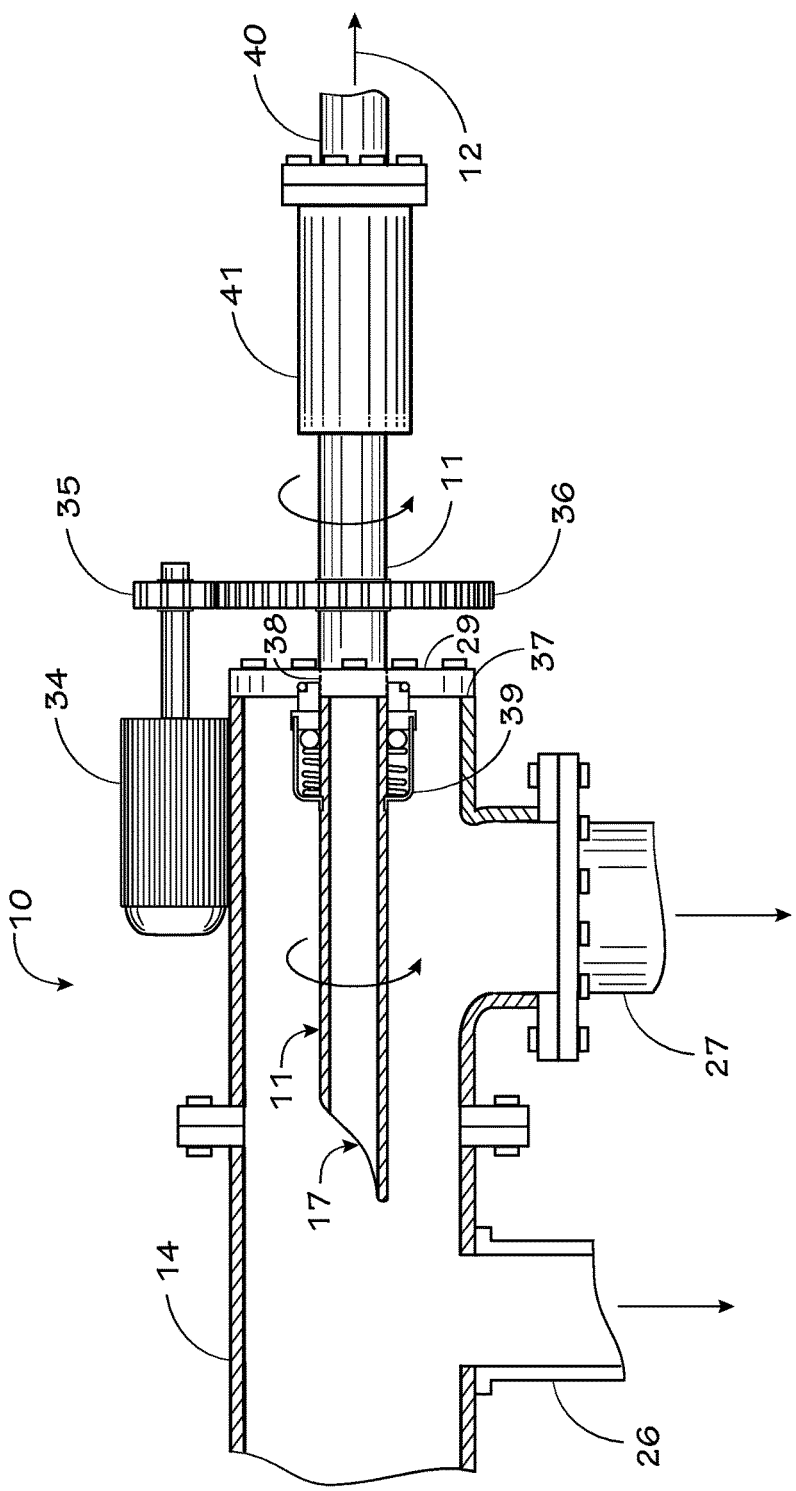
FIG. 7 illustrates a front elevation view, in partial cut-away, of the discharge portion of an improved three-output Richter-type separator of the present disclosure illustrating, in an alternative embodiment, the hollow tube being rotated by a drive motor.

As discussed in the Summary section of this disclosure, the inventor also discovered that the build-up of fiber and other debris on the opening of the hollow tube 11 could be further discouraged by optionally rotating the hollow tube 11. It may be sufficient and desirable to rotate the tube slowly; for example, at a rate of 1 to 5 rotations-per-minute (rpm). Referring to FIG. 7, as the leading edge of the hollow tube 11 rotates, the continuously changing direction of the force vectors of the liquid entering the hollow tube 11 during rotation will tend to further dislodge any material that may be hanging on to the leading edge. The rotation of the hollow tube 11 in combination with the non-cylindrical profile of the leading edge of the tube end 17 encourages the dislodged material to be sucked into the hollow tube 11. This is especially advantageous to help prevent build-up of fibrous material on the opening of the hollow tube 11 over a long period of time.

In FIG. 7, which illustrates, in partial cutaway view, the discharge portion of an alternative embodiment of the improved three-output Richter-type separator 10, the hollow tube 11 is shown rotated by a drive motor 34. The drive motor 34 is rotationally coupled to the hollow tube 11 by a combination of a first gear 35 and a second gear 36. The first gear 35 is directly driven by the shaft of the drive motor 34. The second gear 36 directly drives the hollow tube 11. The drive motor 34 is illustrated as an electric motor but may be hydraulic or water-driven. Alternatively, the drive motor 34 can be coupled to the hollow tube 11 by a belt and pulley combination, by magnetic coupling, or other combinations of coupling a motor to a shaft or tube known to one of ordinary skill in the art.

The cover plate 29 is shown attached to the body end 37 forms a closed watertight surface with the body 14. The cover plate 29 includes an aperture 38 that is concentric to the body 14. A mechanical shaft seal 39 couples the hollow tube 11 to and the aperture 38 in the cover plate 29 an maintains a watertight seal between the cover plate 29 and the hollow tube 11 even as the hollow tube 11 rotates. A stationary discharge tube 40 for carrying away the lighter-than-water solids stream 12 is shown coupled to the hollow tube 11. The hollow tube 11 can be coupled to a stationary discharge tube 40 by an inline rotating seal, such as a rotating union 41 illustrated in FIG. 7. In FIG. 7, the hollow tube 11 is shown positioned longitudinally with respect the body 14 between the first outlet port 26 and the second outlet port 27.

While the novel arrangements described in this disclosure are embodied in the improved three-output Richter-type separator 10 of FIGS. 1-7, it can be advantageously applied to other three-output axial-flow type separators that utilize a hollow tube sized and positioned to discharge the lighter-than-water fraction, and that is axial to the central axis of the impeller of the three-output axial-flow separators. As an example, the hollow tube as described for FIGS. 1-7 of the present disclosure can be applied to the separating device (element 1) of U.S. Pat. No. 8,852,323. The contents of U.S. Pat. No. 8,852,323 (here after "Schook") are hereby incorporated by reference. In one embodiment, the second auxiliary discharge tube of FIGS. 1-2 of Schook can be replaced by the hollow tube 11 of FIGS. 1-7 of the present disclosure.

Similarly, the combination of hollow tube 11 and drive motor 34 of FIG. 7 can be advantageously added to FIGS. 1-2 of Schook.

An apparatus separating fluids having different specific gravities has been described. It is not the intent of this disclosure to limit the claimed invention to the examples, variations, and exemplary embodiments described in the specification. Those skilled in the art will recognize that variations will occur when embodying the claimed invention in specific implementations and environments. For example, it is possible to implement certain features described in separate embodiments in combination within a single embodiment. Similarly, it is possible to implement certain features described in single embodiments either separately or in combination in multiple embodiments. It is the intent of the inventor that these variations fall within the scope of the claimed invention. While the examples, exemplary embodiments, and variations are helpful to those skilled in the art in understanding the claimed invention, it should be understood that, the scope of the claimed invention is defined solely by the following claims and their equivalents.

What is claimed is:

1. An apparatus for separating solids within a water carrier having different specific gravities, comprising:
    an axial-flow pump including an impeller (13) and a body (14) extending longitudinally downstream from the impeller (13);
    a hollow tube (11) axial to the impeller (13), inwardly co-axial to the body (14), extending longitudinally into the body (14), and sized and positioned to discharge a lighter-than-water solids stream (12);
    a tube end (17) of the hollow tube (11) facing the impeller (13) and defining an opening; and
    the opening making an oblique angle and including a concave contour with respect to a longitudinal axis of the hollow tube (11).

2. The apparatus of claim 1, further comprising:
    a drive motor (34) rotationally coupled to the hollow tube (11); and
    the hollow tube (11) rotatable by the drive motor (34) in relationship to the body (14).

3. The apparatus of claim 2, further comprising:
    the body (14) including a body end (37) that is distal to and opposing the impeller (13);
    a cover plate (29) attached to the body end (37) forming a closed surface therein;
    the cover plate (29) including an aperture (38) that is concentric to the body (14); and
    a mechanical shaft seal (39) coupling the hollow tube (11) and the aperture (38) creating a watertight seal between the cover plate (29) and the hollow tube (11).

4. The apparatus of claim 1, wherein:
    the opening includes a convex contour in a plane perpendicular to the concave contour.

5. An apparatus for separating solids within a water carrier having different specific gravities, comprising:
    an axial-flow pump including an impeller (13) and a body (14) extending longitudinally downstream from the impeller (13);
    the impeller (13) including two or more helical blades (15) having decreasing axial pitch in a direction of fluid flow and defining a hollow core (16) that passes fluid and occupies a central axis of the impeller (13);
    a hollow tube (11) axial to the hollow core (16), inwardly co-axial to the body (14), extending longitudinally into the body (14), and sized and positioned to discharge a lighter-than-water solids stream (12);
    a tube end (17) of the hollow tube (11) facing the impeller (13) and defining an opening; and
    the opening making an oblique angle and including a concave contour with respect to a longitudinal axis of the hollow tube (11).

6. The apparatus of claim 5, further comprising:
    a drive motor (34) rotationally coupled to the hollow tube (11); and
    the hollow tube (11) rotatable by the drive motor (34) in relationship to the body (14).

7. The apparatus of claim 6, further comprising:
    the body (14) including a body end (37) that is distal to and opposing the impeller (13);
    a cover plate (29) attached to the body end (37) forming a closed surface therein;
    the cover plate (29) including an aperture (38) that is concentric to the body (14); and
    a mechanical shaft seal (39) coupling the hollow tube (11) and the aperture (38) creating a watertight seal between the cover plate (29) and the hollow tube (11).

8. The apparatus of claim 5, wherein:
    the opening includes a convex contour in a plane perpendicular to the concave contour.

9. An apparatus for separating a fluid into three fractions according to specific gravity, comprising:
    an improved three-output Richter-type separator (10) including a body (14) encompassing the fluid during a three-part separation process and a hollow tube (11) that is co-axial to the body (14);
    the hollow tube (11) sized and positioned to discharge a lighter-than-water solids stream (12);
    a tube end (17) of the hollow tube (11) defining an opening and facing into the improved three-output Richter-type separator (10); and
    the opening making an oblique angle and including a concave contour with respect to a longitudinal axis of the hollow tube (11).

10. The apparatus of claim 9, wherein:
    the opening includes a convex contour in a plane perpendicular to the concave contour.

11. An apparatus for separating a fluid into three fractions according to specific gravity, comprising:
    an improved three-output Richter-type separator (10) including a body (14) encompassing the fluid during a three-part separation process and a hollow tube (11) that is co-axial to the body (14);
    the hollow tube (11) sized and positioned to discharge a lighter-than-water solids stream (12);
    a tube end (17) of the hollow tube (11) defining an opening and facing into the improved three-output Richter-type separator (10); and
    the opening making an oblique angle with respect to a longitudinal axis of the hollow tube (11);
    a drive motor (34) rotationally coupled to the hollow tube (11); and
    the hollow tube (11) rotatable by the drive motor (34) in relationship to the body (14).

12. The apparatus of claim 11, further comprising:
    the body (14) including a body end (37) forming the discharge side of the improved three-output Richter-type separator (10);
    a cover plate (29) attached to the body (14) end forming a closed surface therein;
    the cover plate (29) including an aperture (38) that is concentric to the body (14); and a mechanical shaft seal (39) coupling the hollow tube (11) and the aperture (38) creating a water tight seal between the cover plate (29) and the hollow tube (11).

* * * * *